(12) United States Patent
Wikus

(10) Patent No.: US 12,486,949 B2
(45) Date of Patent: Dec. 2, 2025

(54) DEVICE FOR TRANSFERRING LIQUID HELIUM, WITH REDUCED TRANSFER LOSSES

(71) Applicant: Bruker Switzerland AG, Faellanden (CH)

(72) Inventor: Patrick Wikus, Nuerensdorf (CH)

(73) Assignee: BRUKER SWITZERLAND AG, Faellanden (CH)

( * ) Notice: Subject to any disclaimer, the term of this patent is extended or adjusted under 35 U.S.C. 154(b) by 237 days.

(21) Appl. No.: 18/466,007

(22) Filed: Sep. 13, 2023

(65) Prior Publication Data
US 2024/0093836 A1     Mar. 21, 2024

(30) Foreign Application Priority Data

Sep. 21, 2022 (DE) ...................... 10 2022 209 941.9

(51) Int. Cl.
*F17C 6/00*        (2006.01)
*F17C 3/08*        (2006.01)
*G01R 33/38*     (2006.01)

(52) U.S. Cl.
CPC ............... *F17C 6/00* (2013.01); *F17C 3/085* (2013.01); *F17C 2203/0391* (2013.01);
(Continued)

(58) Field of Classification Search
CPC ........ F17C 2201/0185; F17C 2201/019; F17C 2201/0195; F17C 2201/058;
(Continued)

(56) References Cited

U.S. PATENT DOCUMENTS 3,399,691 A    9/1968   Schoch et al.
4,332,136 A *   6/1982   Quack ..................... F25B 25/00
                                                                                                  62/48.2
(Continued)

FOREIGN PATENT DOCUMENTS

DE      103 18 895 B3    6/2004
FR      2 752 037 A1    2/1998
(Continued)

OTHER PUBLICATIONS

Bruker Biospin AG „NMR Magnet System UltraShield Magnets (English version) User Manual, Version 006, Commercial publication, Oct. 12, 2004, chapter 12 (pp. 26-30), Faellanden, Switzerland.
(Continued)

*Primary Examiner* — Filip Zec
(74) *Attorney, Agent, or Firm* — LEYDIG, VOIT & MAYER, LTD.

(57) ABSTRACT

A device for transferring liquid helium into a usage helium tank of a usage cryostat includes a reservoir cryostat with a vacuum-insulated reservoir helium tank configured to store liquid helium available for filling the usage helium tank, a supply line for liquid helium, and a gaseous helium return line. The supply line proceeds from the vacuum-insulated reservoir helium tank and is connected to the usage helium tank. The gaseous helium return line leads into the vacuum-insulated reservoir helium tank and is connected to the usage helium tank. The device further includes a conveying device configured to convey liquid helium from the vacuum-insulated reservoir helium tank through the supply line into the usage helium tank and further configured to convey gaseous helium from the usage helium tank through the return line into the vacuum-insulated reservoir helium tank.

20 Claims, 9 Drawing Sheets

(52) U.S. Cl.
CPC ............... *F17C 2205/0323* (2013.01); *F17C 2205/0355* (2013.01); *F17C 2221/017* (2013.01); *F17C 2223/0161* (2013.01); *F17C 2227/0142* (2013.01); *F17C 2227/0304* (2013.01); *F17C 2227/0337* (2013.01); *F17C 2250/0626* (2013.01); *G01R 33/3804* (2013.01)

(58) Field of Classification Search
CPC ...... F17C 2203/0391; F17C 2205/0323; F17C 2205/0355; F17C 2205/0358; F17C 2205/0364; F17C 2221/017; F17C 2223/0161; F17C 2223/033; F17C 2227/0107; F17C 2227/0135; F17C 2227/0142; F17C 2227/0157; F17C 2227/0304; F17C 2227/0337; F17C 2227/0353; F17C 2250/032; F17C 2250/043; F17C 2250/0626; F17C 2265/032; F17C 2265/034; F17C 2270/0509; F17C 2270/0536; F17C 3/085; F17C 6/00
See application file for complete search history.

(56) References Cited

U.S. PATENT DOCUMENTS

| | | | |
|---|---|---|---|
| 6,442,948 B1 | 9/2002 | Takeda | |
| 6,578,365 B2* | 6/2003 | Sicherman | F17C 9/04 |
| | | | 62/48.1 |
| 7,318,327 B2* | 1/2008 | Dickerson | F25J 1/0225 |
| | | | 62/615 |
| 8,955,338 B2* | 2/2015 | Jung | F17C 3/00 |
| | | | 62/50.7 |
| 9,494,344 B2* | 11/2016 | Kraus | F25B 9/002 |
| 10,580,555 B2* | 3/2020 | Ito | H01F 6/06 |
| 11,441,733 B2* | 9/2022 | Heinz | F17C 3/02 |
| 11,686,434 B1* | 6/2023 | Li | F17C 13/025 |
| | | | 141/1 |
| 11,885,465 B2* | 1/2024 | Minas | F17C 5/02 |
| 11,982,407 B2* | 5/2024 | Light | F17C 5/04 |
| 12,078,108 B2* | 9/2024 | Minas | F02C 3/22 |
| 2002/0046567 A1* | 4/2002 | Pelloux-Gervais | F17C 1/16 |
| | | | 220/560.04 |
| 2005/0217281 A1 | 10/2005 | Adler et al. | |
| 2011/0056238 A1* | 3/2011 | Mak | F25J 1/0204 |
| | | | 62/48.1 |
| 2011/0312502 A1 | 12/2011 | Lose et al. | |
| 2014/0174106 A1* | 6/2014 | Tang | B64D 37/30 |
| | | | 62/50.2 |
| 2015/0362128 A1 | 12/2015 | Sanglan et al. | |
| 2018/0016130 A1* | 1/2018 | Watts | B67D 7/0476 |
| 2018/0312390 A1* | 11/2018 | Homann | B67D 7/0478 |
| 2019/0211970 A1 | 7/2019 | Ruiz-Rodriguez et al. | |
| 2023/0349513 A1* | 11/2023 | Bernhardt | F17C 5/02 |

FOREIGN PATENT DOCUMENTS

| | | |
|---|---|---|
| JP | S54 161 109 A | 12/1979 |
| JP | S59129354 A | 7/1984 |
| JP | H0389099 A | 4/1991 |
| JP | 2005221223 A | 8/2005 |
| JP | 4886552 B2 | 2/2012 |
| JP | 2014059022 A | 4/2014 |
| JP | 2015056536 A | 3/2015 |
| JP | 2022084066 A | 6/2022 |

OTHER PUBLICATIONS

Jaroslaw Fydrych "Cryogenic Transfer Lines", J.G. Weisend II (Editor), Cryostat Design, International Cryogenics Monograph Series, Springer International Publishing, Dec. 2016, chapter 9, pp. 1-34, Switzerland.
Bruker Biospin „Heliosmart Recovery Technical Specifications, T187400, Mar. 2022, pp. 1-4, www.bruker.com.
D. Kramer „Helium is again in short supply, Physics Today, Politics & Policy 4, Apr. 2022, pp. 1-10, DOI:10.1063/PT.6.2.20220404a.

* cited by examiner

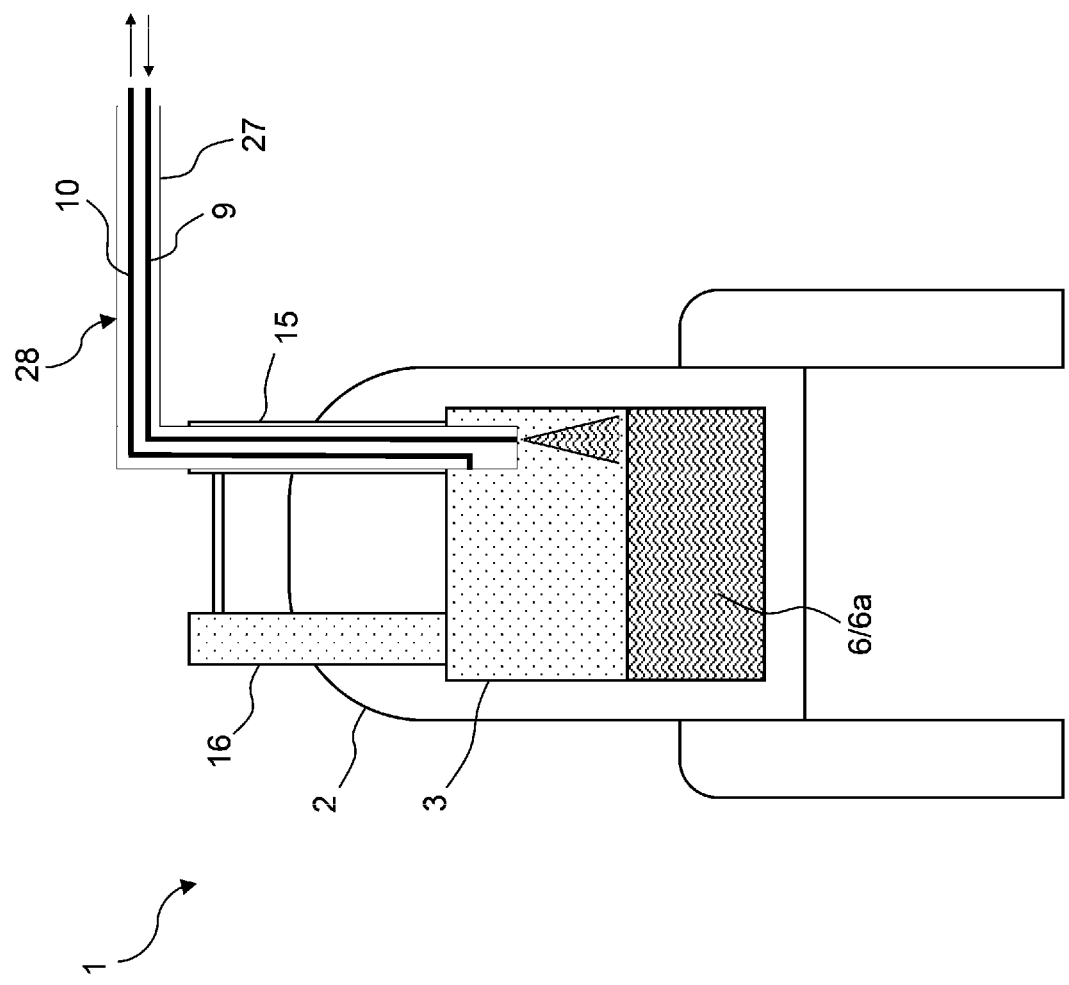

DEVICE FOR TRANSFERRING LIQUID HELIUM, WITH REDUCED TRANSFER LOSSES

CROSS REFERENCE TO RELATED APPLICATIONS

This application claims benefit to German Patent Application No. DE 10 2022 209 941.9, filed on Sep. 21, 2022, which is hereby incorporated by reference herein.

FIELD

The present disclosure relates to a device for transferring liquid helium into a usage helium tank of a usage cryostat, the device including a reservoir cryostat having a vacuum-insulated reservoir helium tank, for storing liquid helium which is available for filling the usage helium tank, and a supply line for liquid helium, which exits from the reservoir helium tank for connection to the usage helium tank.

BACKGROUND

Such a device for transfer has been known, for example, by the company publication "NMR Magnet System Ultra-Shield Magnets (English version) User Manual Version 006" from Bruker BioSpin AG, Fallanden, Switzerland, dated 12 Oct. 2004, in particular chapter 12 (pages 26-30).

Liquid helium is required for cooling various applications, for example for cooling superconducting magnets of nuclear magnetic resonance (NMR) spectrometers and magnetic resonance imaging (MRI) systems. In this case, there is formed in a usage cryostat a vacuum-insulated usage helium tank, in which liquid helium is stored. The liquid helium is used to cool an object, for example a solenoid, which is arranged in the liquid helium.

The liquid helium is slowly consumed during the cooling of the application, so that liquid helium must typically be refilled into the usage cryostat after a few months. Liquid helium is a scarce and relatively expensive commodity.

The standard procedure for refilling liquid helium is usually carried out as follows, cf. the company publication "NMR Magnet System UltraShield Magnets . . . " from Bruker BioSpin AG as above:

1) A reservoir cryostat (also called transportation dewar) with a vacuum-insulated reservoir helium tank, in which liquid helium is stored for refilling the usage cryostat, is brought into the vicinity of the usage cryostat.
2) A room-temperature supply line (also referred to as a transfer line) is inserted at one end into the reservoir cryostat until the end of the supply line projects into the liquid helium.
3) The helium in the reservoir cryostat is thus heated somewhat, and the helium gas pressure rises in the reservoir cryostat and pushes liquid helium into the supply line, which first flows as gaseous helium at the other end of the supply line into the surrounding environment. The supply line cools gradually, and finally liquid helium escapes from the other end of the supply line.
4) The other end of the supply line is then inserted into the usage cryostat.
5) Liquid helium then flows into the usage cryostat and, at the same time, gaseous helium is forced out of the usage cryostat, which remains approximately at atmospheric pressure. The pushed-out gaseous helium usually escapes into the surrounding environment, or the usage cryostat is connected to a recovery system which collects the gaseous helium.
6) In order to ensure sufficient pressure in the reservoir cryostat for conveying the liquid helium into the usage cryostat, the reservoir cryostat is connected to a helium pressurized gas cylinder, and the overpressure in the reservoir cryostat is set to about 50-100 mbar, which is sufficient for the helium transfer.

This process can be easily implemented using relatively simple equipment. However, in this process, a relatively large amount of helium is lost into the surrounding environment, both during cooling of the supply line and during the actual filling of the usage cryostat with liquid helium. In addition, the introduction of room-temperature helium from a helium pressurized gas cylinder in order to thus discharge liquid helium from the reservoir cryostat is energetically unfavorable.

Recovery systems which could collect the gaseous helium exiting from the usage cryostat during filling of the usage cryostat with liquid helium are comparatively complex and expensive. The cold helium, which escapes from the usage cryostat during the transfer, heats up to room temperature on its way to the recovery system, and therefore undergoes a significant increase in volume by a factor of 10 and more. The helium which escapes from the usage cryostat must in many cases even be heated actively, since components of the recovery system (compressors, balloon accumulators, etc.) cannot be designed economically for operation with cold gases.

Recovery systems typically have either a large low-pressure accumulator for temporarily storing the gaseous helium before the liquefaction or compression thereof for space-saving storage (for example a large-volume balloon accumulator, which requires a relatively large amount of space) or a high-pressure accumulator with an upstream, very powerful and thus expensive compressor, which has to be directly designed for the helium flow which is pushed out of the usage cryostat during refilling of the liquid helium into the usage cryostat. The helium escaping from the usage cryostat could theoretically also be cooled and liquefied directly by a correspondingly sized refrigerating machine for space-saving storage in the liquid state. However, the refrigerating machine of the recovery system would then have to be directly designed for the very high helium gas flow which is pushed out of the usage cryostat during refilling of the liquid helium into the usage cryostat. In the latter case, the refrigerating machine would be very expensive and would be utilized to nowhere near its full capacity during normal operation of the application.

US 2011 0 312 502 A proposes controlling the transfer of liquid helium from a container to a magnet via the gas pressure in the container.

US 2019/0 211 970 A1 describes a system for automatically refilling cryogenic helium. The system comprises an automatic valve device by means of which helium gas can be introduced from a pressurized gas source into an LHe dewar, which is connected via a transfer line for liquid helium to an LHe cryostat. The LHe fill levels in the LHe dewar and in the LHe cryostat are monitored by sensor.

U.S. Pat. No. 3,399,691 proposes pumping liquid helium from a supply location to a tank using a cold pump.

In JP S54 161 109 A, it is proposed to provide an outlet valve in the supply line between a storage container for liquid helium and a cryostat, and to first cool a front part of the supply line to prepare a transfer of liquid helium, wherein gaseous helium is collected by the outlet valve in a balloon accumulator.

FR 2 752 037 A1 provides for gaseous helium flowing out of the cryostat to be fed past the supply line for the liquid helium during the filling of a cryostat with liquid helium. The helium flowing out is collected and can in particular be compressed.

J. G. Weisend II (ed.), Cryostat Design, International Cryogenics Monograph Series, Springer International Publishing Switzerland 2016, Chapter 9, describes various types of cryogenic transfer lines, in particular with vacuum insulation.

U.S. Pat. No. 6,442,948 B1 describes a recondensation device for liquid helium, wherein gaseous helium is conducted from a reservoir for liquid helium via a line to a refrigerator, is liquefied at the refrigerator, and the reliquefied helium is returned to the reservoir via a further line. The line and the further line run in a common vacuum insulation.

It is known from the company publication "Heliosmart Recovery Technical Specifications" from Bruker BioSpin, dated March 2022, to collect evaporating helium from an NMR magnet in continuous operation and to store it in pressurized gas cylinders. The Bruker Heliosmart Recovery has an internal balloon accumulator and a three-stage high-pressure compressor. It is not designed to collect and store helium which is obtained at the high flow rates, which is pushed out of this usage cryostat during the refilling of liquid helium into a usage cryostat.

D. Kramer, "Helium is again short in supply", Physics Today, Apr. 4, 2022, describes a current bottleneck in the supply with liquid helium, which has led to a doubling of the price for helium in the last two years.

SUMMARY

In an embodiment, the present disclosure provides a device for transferring liquid helium into a usage helium tank of a usage cryostat. The device includes a reservoir cryostat with a vacuum-insulated reservoir helium tank configured to store liquid helium available for filling the usage helium tank, a supply line for liquid helium, and a gaseous helium return line. The supply line proceeds from the vacuum-insulated reservoir helium tank and is connected to the usage helium tank. The gaseous helium return line leads into the vacuum-insulated reservoir helium tank and is connected to the usage helium tank. The device further includes a conveying device configured to convey liquid helium from the vacuum-insulated reservoir helium tank through the supply line into the usage helium tank and further configured to convey gaseous helium from the usage helium tank through the return line into the vacuum-insulated reservoir helium tank.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 shows a schematic representation of a detail of a fourth embodiment of a cryotank arrangement, comprising a common transport line with a common vacuum delimitation;

DETAILED DESCRIPTION

Figure 1:
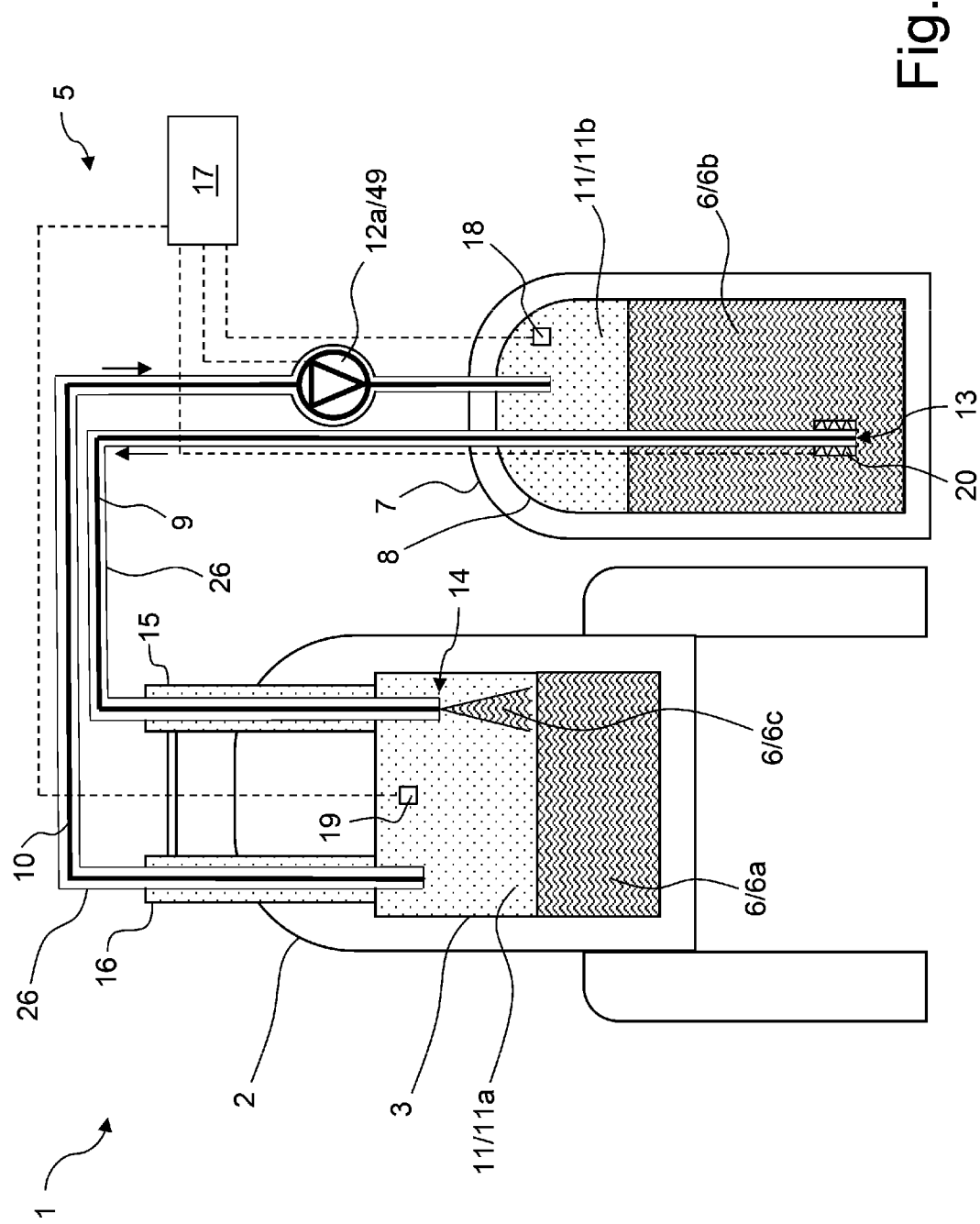
FIG. 1 shows a schematic representation of a first embodiment of a cryotank arrangement with a device for transferring liquid helium, with a cold circulation pump in the return line.

The present disclosure provides a device for transferring liquid helium, with which transfer losses can be reduced in a simple manner.

According to a first aspect, the present disclosure provides a device for transferring liquid helium into a helium usage tank of a usage cryostat. The device includes a reservoir cryostat having a vacuum-insulated reservoir helium tank, for storing liquid helium which is available for filling the usage helium tank, and a supply line for liquid helium, which exits from the reservoir helium tank for connection to the usage helium tank. The device further includes a return line for gaseous helium, which leads into the reservoir helium tank, for connection to the usage helium tank, and a conveying device with which liquid helium from the reservoir helium tank can be conveyed through the supply line into the usage helium tank and gaseous helium from the usage helium tank can be conveyed through the return line into the reservoir helium tank.

Within the scope of the present disclosure, a closed system can be set up by means of the supply line and the return line in the filling of the usage cryostat or its usage helium tank with liquid helium from the reservoir cryostat or its reservoir helium tank.

Gaseous helium, which is pushed out of the usage helium tank with new liquid helium during the filling of the usage helium tank, is brought back into the reservoir helium tank via the return line without intermediate storage and with low heat input, and is not lost, accordingly. Complex intermediate storage of the gaseous helium before its compression or liquefaction (for example in a balloon accumulator at atmospheric pressure and ambient temperature) is not necessary and also not provided within the scope of the present disclosure. The gaseous helium introduced into the reservoir helium tank can help to convey the liquid helium out of the reservoir helium tank into the supply line, in particular to push it out.

If no noticeable heat inputs occur, the volume of the gaseous helium pushed out of the usage helium tank corresponds to the volume of the liquid helium discharged from the reservoir helium tank and also the volume of the gaseous helium fed back into the reservoir helium tank. In practice, a certain heating cannot be avoided, and therefore, at least temporarily, a little more (in relation to the volume) gaseous helium is conveyed into the reservoir helium tank than liquid helium is discharged from the reservoir helium tank, with a corresponding increase in the pressure in the reservoir helium tank. This can be useful during the discharge of the liquid helium through the supply line and is not critical (if the pressure rise is not too great). If the liquid helium in the reservoir helium tank has a temperature slightly below the boiling point (4.2 K at atmospheric pressure), the gaseous helium introduced into the reservoir helium tank can be cooled again by the liquid helium, in particular up to 4.2 K, as a result of which a pressure increase in the reservoir helium tank remains limited. For example, (at the beginning of the transfer of liquid helium) the temperature of the liquid helium in the reservoir helium tank can be 3.6 K or less or 3.0 K or less. In the event of an excessive pressure rise, gaseous helium can also be discharged from the system, for example from the reservoir helium tank, in particular via a safety valve (overpressure valve) into the surrounding environment. As a rule, however, this is not necessary, and preferably the cryostat assembly comprising the device for transfer and the connected usage cryostat is configured as closed for the helium during the transfer of the liquid helium.

The conveying device conveys the liquid helium from the reservoir helium tank into the usage helium tank and conveys gaseous helium from the usage helium tank into the reservoir helium tank. Typically, one stream is conveyed directly (usually the stream of gaseous helium) and the other gas stream is conveyed indirectly (usually the stream of liquid helium). The conveying device typically comprises a conveying pump. The pressure (gas pressure) in the reservoir helium tank and in the usage helium tank can be influenced via the conveying device, as can, in particular, a pressure difference between the reservoir helium tank and usage helium tank. As a rule, during the transfer, the pressure in the reservoir helium tank is somewhat greater than the pressure in the usage helium tank. Typically, a slight overpressure is maintained in the entire system relative to the atmospheric pressure in the surrounding environment in order to minimize contamination of the helium circuit with air or air components.

The reservoir helium tank and the usage helium tank typically each have a storage volume of at least 50 liters, preferably at least 100 liters.

PREFERRED EMBODIMENTS

In a preferred embodiment of the device according to the first aspect, the supply line and the return line are vacuum-insulated. This minimizes heating of the liquid helium and of the gaseous helium during transport between the helium tanks.

A development of this embodiment is preferred in which the supply line and the return line are at least partially formed in a common transport line, which has a vacuum chamber within a common vacuum delimitation, in which both the supply line and the return line run. This is space-saving and material-saving, simplifies handling, and is also energetically favorable. In particular, it is possible to at least partially thermally decouple the supply line from the environment with the return line, or to minimize the thermal coupling of the supply line to the surrounding environment. The supply line and the return line typically run, at least in a portion close to the usage cryostat, as a common transport line and are connected to the usage cryostat via a common helium tower of the usage cryostat with the common transport line, wherein preferably at least one further helium tower with its full cross section is available for an emergency discharge of gaseous helium from the usage helium tank, in particular in the case of quenching of a superconducting magnet coil in the usage cryostat. The quenching of a solenoid means a sudden loss of the superconductivity, which leads to a sudden release of the stored electromagnetic energy as heat, and can thus lead to a sudden evaporation of a large amount of helium.

Particularly advantageous is a further development in which the supply line and the return line run coaxially within the common vacuum delimitation, wherein the supply line lies radially inside the return line. As a result, the return line thermally shields the supply line; the return line acts as a radiation shield.

Preferred is also a further development in which the supply line and the return line run parallel to one another and next to one another in the common vacuum delimitation. This is structurally particularly simple and cost-effective in its configuration.

In a further development, it is provided that the return line is suspended by means of one or more separators on the common vacuum delimitation, and that the supply line is suspended from the return line with one or more separators, but not at the common vacuum delimitation. As a result, as far as heat conduction is concerned via the separators, the supply line is decoupled from the vacuum delimitation, and the heat input from the surrounding environment into the supply line guiding the liquid helium is particularly low.

An embodiment is advantageous in which the following applies for a line cross section QZ of the supply line and a line cross section QR of the return line: $QR>QZ$, preferably $QR \geq 3*QZ$, particularly preferably $QR \geq 5*QZ$. In this case, the device can also operate very reliably in the case of a somewhat heating current of gaseous helium, and pressure losses in the return line are minimized.

Furthermore, an embodiment is preferred in which the supply line and the return line are flexible. This facilitates handling and laying of the supply line and the return line, especially in the case of only temporary installation for individual filling of the usage cryostat with liquid helium.

An embodiment is advantageous in which the conveying device comprises a circulation pump for liquid helium in the supply line. The liquid helium can thereby be transferred very efficiently; the delivery rate of liquid helium can be controlled directly. A comparatively low pressure can be set in the reservoir helium tank, since the (gas) pressure is not required for discharging the liquid helium.

Particularly preferred is an embodiment in which the conveying device comprises a circulation pump for gaseous helium in the return line. This is structurally simple in its configuration, and gaseous helium circulation pumps are cost-effective and easily and reliably operated. Gas bubble formation and cavitation effects that would have to be observed in a pump in the supply line do not play a role here.

In a preferred development of this embodiment, it is provided that the return line comprises a line loop with an inlet region and an exit region, wherein the exit region is thermally coupled to the inlet region via a heat exchanger, and that the line loop contains the circulation pump, in particular wherein the circulation pump is at room temperature. In this design, the circulation pump does not need to be designed for cryogenic operation, which structurally is particularly simple and also particularly cost-efficient.

Also advantageous is an embodiment that provides that the conveying device comprises a piston in the reservoir helium tank, wherein the piston is movable in the reservoir helium tank and separates a first part of the reservoir helium tank for gaseous helium from a second part of the reservoir helium tank for liquid helium, and that the supply line branches off in the second part, and the return line leads into the first part. By means of the piston (also called slider), liquid helium can be discharged from the reservoir in a simple manner. A circulation pump is then not necessary. In addition, the supply line and the return line between the usage cryostat and the reservoir cryostat can run completely as a common transport line.

Furthermore, an embodiment is preferred in which the device further comprises a control unit for controlling a helium pressure in the device and/or in the usage helium tank, in particular wherein the control unit is designed to control the conveying device. Typically, a helium pressure above atmospheric pressure is controlled everywhere in the device (in particular in the reservoir helium tank) and in the usage helium tank, in order to minimize penetration of air. In particular, a differential pressure, sufficient for discharging the liquid helium, between the reservoir helium tank and usage helium tank can be established via the control unit, in particular by actuating the conveying device. In the case of a high pressure in the system, for example in the usage helium tank, an opening of at least one discharge valve can also be triggered by the control unit. Alternatively or additionally, it is also possible to provide one or more overpressure valves that are independent of the control unit (e.g., passive, prestressed only by springs). The control unit is typically connected to a gas pressure sensor in the usage helium tank. Typically, the control unit also comprises a gas pressure sensor in the reservoir helium tank.

Preferred is a development of this embodiment in which the device further comprises: a heating device, in particular arranged in the reservoir helium tank; and/or a helium pressurized gas accumulator with a control valve, in particular for connection to the usage helium tank, in particular wherein the control unit is designed to control the heating device and/or the control valve. By means of the heating device or the helium pressurized gas accumulator, it is possible in a simple manner to increase the amount of gas—and thus the pressure—in the system, in particular to ensure a slight overpressure in the system, which minimizes the ingress of air from the surrounding environment. The heating device can be arranged, for example, at a lower end of the supply line, which projects into the liquid helium in the reservoir helium tank. The heating device is typically electric. The helium pressurized gas accumulator ("pressurized gas cylinder") is typically at room temperature.

It is advantageously provided in one embodiment that the device comprises a laboratory liquefier for helium, wherein the laboratory liquefier comprises: the reservoir cryostat with the reservoir helium tank, and a cryocooler for liquefying gaseous helium. The laboratory liquefier provides the reservoir cryostat. The laboratory liquefier has a relatively low liquefaction capacity, typically 40 liters/day or less, usually 25 liters/day or less, and in many cases approximately 20 liters/day. In the course of its regular operation, the laboratory liquefier can collect liquid helium which is evaporated as gaseous helium on the usage cryostat (for example an NMR apparatus) in the course of the regular operation of an application and was liquefied by the cryocooler. With the cryocooler, in particular the accumulated liquid helium can be cooled under the boiling point of liquid helium at atmospheric pressure (about 1 bar), that is to say below 4.2 K, as a result of which a cold reserve for the transfer of the liquid helium during refilling of the usage cryostat can be kept available. This cold reserve ("cold energy") can compensate for heat inputs into the system during transfer of the liquid helium, thereby reducing or preventing an undesirably high pressure increase in the system. The cryocooler can build up the cold reserve over a long time (e.g. over several weeks), as a result of which has to be dimensioned only slightly above the requirements of regular operation.

Cryotank Arrangements

According to a second aspect, the present disclosure provides a cryotank arrangement comprising an above-described device according to the first aspect and also the usage cryostat with the usage helium tank, wherein the supply line is connected to the usage helium tank and leads into the usage helium tank, and wherein the return line is connected to the usage helium tank and exits from the usage helium tank. The usage helium tank can be filled with liquid helium from the device, wherein transfer losses of helium, in particular of liquid helium, can be minimized. The connection between the device for the transfer of liquid helium ("transfer device"), on the one hand, and the usage cryostat with the usage helium tank, on the other hand, is typically designed to be detachable (or reversible); as a result, the transfer device can be removed from the usage cryostat during regular operation and can optionally also be used in alternation in the case of a large number of usage cryostats.

Advantageous is an embodiment of the cryotank arrangement in which the cryotank arrangement further comprises at least one pressure sensor in the region of the usage helium tank, in particular wherein the pressure sensor is connected to a control unit of the device. The pressure sensor can monitor the gas pressure in the usage helium tank, in particular in order to keep it above the ambient pressure (atmospheric pressure) with the aid of the control unit in order to minimize the ingress of air into the system.

Method for Transferring Liquid Helium

According to a third aspect, the present disclosure provides a method for transferring liquid helium from a reservoir helium tank of a reservoir cryostat into a usage helium tank of a usage cryostat, wherein liquid helium stored in the reservoir helium tank is conveyed from the reservoir helium tank into the usage helium tank by a supply line for liquid helium which proceeds from the reservoir helium tank and is connected to the usage helium tank, characterized in that at the same time, gaseous helium from the usage helium tank is returned to the reservoir helium tank by a return line for gaseous helium which is connected to the usage helium tank and leads into the reservoir helium tank. This method minimizes transfer losses of helium, in particular of liquid helium, during refilling of the usage cryostat with liquid helium from the reservoir cryostat. The helium returned via the return line into the reservoir helium tank is not lost, does not need to be temporarily stored, and can help to convey, in particular push out, the liquid helium from the reservoir helium tank. Typically, during the transfer of the liquid helium, the delivery rate is at least 8 kg/h, usually at least 12 kg/h. Within the scope of the method, an above-described device according to the first aspect or also an above-described cryotank arrangement according to the second aspect can be used. The usage cryostat can in particular be the cryostat of an NMR magnet.

Preferred is a variant of the method which provides that the volume flows of liquid helium through the supply line and of gaseous helium through the return line are approximately the same. In other words, the liquid helium is transferred in a closed circuit between the reservoir helium tank and usage helium tank (without outlet into the environment or additional intermediate storage of helium outside the reservoir helium tank and the usage helium tank). The transfer is highly efficient and minimizes transfer losses. Typically, the volume flows of liquid helium through the supply line and of gaseous helium through the return line differ by 10% or less, usually 5% or less, and preferably 1% or less, in relation to the smaller of the volume flows (in the case of helium transfer under stable conditions).

Also advantageous is a variant that provides that, for a temperature TLHe of the liquid helium in the reservoir helium tank, at least at the start of the transfer of the liquid helium, the following applies: $TLHe<4.2$ K, preferably $TLHe \leq 3.6$ K, particularly preferably $TLHe \leq 3.0$ K, in particular wherein the temperature TLHe of the liquid helium in the reservoir helium tank has been set before the start of the transfer of the liquid helium to a cryocooler of a laboratory liquefier in which the reservoir cryostat is integrated with the reservoir helium tank. By means of the liquid helium at a temperature significantly below the boiling point (4.2 K at atmospheric pressure), a cold supply is established, which can compensate for heat input into the system during the transfer of liquid helium into the usage cryostat, and can thus limit a pressure increase in the system; in particular, helium gas conveyed back from the usage cryostat into the reservoir cryostat can be cooled again by means of the cold supply, and possibly also be reliquefied. If the liquid helium in the reservoir helium tank is cooled below the temperature of the phase transition to superfluid helium (2.17 K at atmospheric pressure), a particularly large cold supply is available due to the high specific heat in the region of the phase transition.

Further advantages are found in the description and the drawing. Likewise, the features mentioned above and those detailed below can be used individually or collectively in any combination. The embodiments shown and described are not to be understood as an exhaustive list, but rather have an exemplary character for the description.

In the context of the present disclosure, liquid helium is to be used as sustainably as possible. Superconducting magnets—for example for NMR and MRI—are typically cooled with liquid helium. Helium is usually obtained as a by-product in natural gas production or is conveyed from so-called "helium sources" (gas sources which have an unusually high proportion of helium). Helium is a scarce resource, the availability of which is always lower on the world market. This is a trend that will intensify in the future.

The scarcity of helium leads to constantly increasing prices, which makes the operation of devices that require helium (e.g., superconducting magnets) ever more expensive. Moreover, considerable uncertainty exists occasionally as to whether liquid helium will be available at all at a certain point in time, which leads to plants that require liquid helium having to be taken out of operation.

Liquid helium is transported by the supplier to the consumer (e.g., operating an NMR magnet) by means of a so-called "transportation dewar" (also referred to here as a reservoir cryostat). These are vacuum-insulated vessels which are typically equipped with rollers. The liquid helium must then be transferred by means of a vacuum-insulated transfer line from the transportation dewar into the NMR magnet or another usage cryostat. The devices and methods described herein helps to make this transfer more efficient.

Many consumers also invest in plants for helium recovery, in which the helium gas evaporated from the device (e.g., the NMR Magnet) or the helium gas pushed out of the device during a transfer is collected and is then supplied to a pressure accumulator or helium liquefier. The helium liquefied again by a helium liquefier can then again be fed to the NMR magnet for cooling the superconducting coil.

Recovery systems typically have either a large low-pressure accumulator for temporarily storing the gaseous helium before the liquefaction or compression thereof for space-saving storage (for example a large-volume balloon accumulator, which requires a relatively large amount of space) or via a high-pressure accumulator with an upstream, very powerful and thus expensive compressor, which has to be designed directly for the helium flow which is pushed out of the usage cryostat during refilling of the liquid helium in the usage cryostat. The helium escaping from the usage cryostat could theoretically also be cooled and liquefied directly by a correspondingly dimensioned refrigerating machine for space-saving storage in the liquid state. The refrigerating machine of the recovery system then has to be directly designed for the very high helium gas flow which is pushed out of the usage cryostat during refilling of the liquid helium into the usage cryostat. In the latter case, the refrigerating machine would be very expensive and would be utilized to nowhere near its full capacity during normal operation of the application. The devices and methods described here make it possible to dispense with a large-volume balloon accumulator, oversized compressors or oversized refrigerating machines.

A helium transfer usually proceeds as follows (see also the company publication mentioned at the outset "NMR Magnet System UltraShield Magnets (English version) User Manual Version 006" from Bruker BioSpin AG):

The transportation dewar is brought into the vicinity of the NMR magnet (a few meters distance).

The warm transfer line is inserted into the transportation dewar, so that its end comes to lie below the liquid surface.

As a result of the heat input of the warm transfer line, helium evaporates in the transportation dewar—as a result of this the pressure in the transportation dewar increases, and liquid helium is pushed into the transfer line, which is thereby cooled. The helium which escapes from the end of the line during the cooling process is usually not collected and is lost into the atmosphere. For a typical transfer line with a few meters length, some liters of liquid helium are required for cooling.

As soon as the helium which escapes from the end of the line which is furthest away from the transportation dewar is sufficiently cold (i.e., the transfer line has cooled sufficiently), the transfer line is connected to the NMR magnet (or the end thereof is plugged into the cryostat of the NMR magnet).

After the transfer line has been connected to the NMR magnet, liquid helium flows from the transportation dewar into the NMR magnet. The mass flow is driven by the pressure difference which prevails between the transportation dewar and NMR magnet. In the transportation dewar, an overpressure has been built up by inserting the transfer line as mentioned above. The outlet of the magnet (the connection from which helium escapes from the NMR magnet) leads either directly into the atmosphere or is connected to a recovery system which ensures that approximately atmospheric pressure always prevails at the outlet.

Usually, the pressure build-up in the transportation dewar, which is established due to the heat input when the transfer line is inserted, is not sufficient to transfer the desired amount of helium. The pressure in the transportation dewar is therefore kept artificially high by keeping the transportation dewar constantly high with helium gas from a pressure cylinder via a pressure controller. Typically, the overpressure which is set in the transportation dewar is about 50-100 mbar.

Before a helium transfer is started, the helium tank of the NMR magnet is not empty—the tank is largely filled with gaseous helium at a temperature of about 4.2 K. When the helium tank slowly fills with liquid helium during the transfer, the cold gaseous helium which was located in the helium tank before the start of the transfer is successively pushed out of the helium tank and escapes via the outlet of the magnet.

Gaseous helium at 4.2 K and atmospheric pressure has a density of 16.5 g/l. Liquid helium at 4.2 K and atmospheric pressure has a density of 125 g/l. If, for example, 100 liters of liquid helium—i.e. 12.5 kg helium—are transferred, 100 liters of gaseous helium—i.e. 1.65 kg—are thus pushed out of the magnet. This corresponds to 13.2 liters of liquid helium or 13.2 percent of the transferred amount.

In the worst case, this helium quantity escapes via the outlet of the magnet into the atmosphere. Since this is not sustainable, many users decide to install a gas balloon accumulator that is dimensioned sufficiently large to absorb the helium generated during the helium transfer (the "transfer losses") and to supply it to a high-pressure accumulator and/or liquefier. The gaseous helium heats up to room temperature in the line system leading to the gas balloon, or in the balloon itself. Often, the gas is also intentionally heated in heat exchangers upstream of the gas balloon, since gas balloons are usually not compatible with low temperatures (e.g. due to ice formation, condensation water or material embrittlement). The heating of the helium gas leads to a large increase in volume of the gas. 100 liters of gaseous helium at atmospheric pressure and 4.2 K correspond to approximately 10,000 liters (i.e. 10 $m^3$) at atmospheric pressure and room temperature.

During a helium transfer into an NMR magnet, typically between 100 and 400 liters of liquid helium are transferred—depending on the type of magnet. A transfer takes approximately one hour. In this time, between 10 and 40 cubic meters of gaseous helium are thus produced at room temperature and must be stored in a gas balloon or processed by a recovery system (e.g. compressed in a pressure accumulator). These transfer losses are equivalent to 13 l/h to 50 l/h of liquid helium (or between about 1.6 and 6.6 kg of helium per hour).

For comparison, the helium consumption of some typical NMR magnets in normal operation is as follows:
  400 MHz: 0.013 l/h
  500 MHz: 0.013 l/h
  600 MHz: 0.016 l/h
  700 MHz: 0.026 l/h
  800 MHz: 0.05 l/h
  1.2 GHz: 0.25 l/h.

It is obvious that, during the transfer of the liquid helium, the transfer losses per unit of time are much greater than the helium consumption in normal operation, and that recovery systems (if they are also to be able to process the helium transfer) therefore have to be designed for a large peak load, which, however, occurs only relatively rarely (typically at an interval of several months for only one to two hours). Particularly, the gas storage balloons with a volume of many cubic meters are difficult to accommodate in NMR laboratories and take up expensive volume in a building. Moreover, gas balloons have other disadvantages. By diffusion through the surface of the balloon, helium can escape, for example, and impurities (moisture, constituents of air) can penetrate into the helium circuit.

Recently, small recovery systems have been placed on the market, which are dimensioned for the evaporation rates in normal operation, cf. the company publication mentioned at the outset "Heliosmart Recovery Technical Specifications" from Bruker BioSpin. In such systems, which are very cost-effective and easy to install due to their compactness, it is consciously accepted that transfer losses cannot be absorbed and are therefore lost.

The common practice to initiate the process of introducing room-temperature gaseous helium from a gas cylinder into the transportation dewar at the start of the process, or to dissipate heat in the transportation dewar, which leads to the evaporation of liquid helium and thus builds pressure in the transportation dewar, are also energetically unfavorable. Liquid helium which was originally liquefied with great energy expenditure is wasted.

There are various concepts to allow helium to be circulated in a closed circuit during normal operation of applications, for example as described in U.S. Pat. No. 6,442,948 B1 cited at the outset. In the case of such a circulation, it is not necessary to process large amounts of gaseous helium within a short time. However, corresponding plants are usually expensive and complex in their procurement and operation, and various operational disturbances may occur. In addition, vibrations can easily be introduced into the usage cryostat by means of the cryocooler running during normal operation and may impair the desired application (for example NMR measurements). Solutions which are based on cooling in a closed circuit cannot easily be retrofitted in existing systems, and therefore are also out of question for all current operators.

In contrast, the present disclosure relates to plants in which occasionally a large amount of liquid helium is transferred in a short time in order to then be available for the cooling over a long time in a cryostat (usage cryostat). The advantage of such a "batch transfer" is that the cryostat can be operated independently for a long time without relying on the continuously circulating helium for cooling. This leads to particularly high reliability and also low vibration, which is important for many applications—e.g., in NMR. In the case of such a batch transfer, however, large amounts of cold helium gas, as shown above, must be expressed and processed. The majority (estimated >99%) of all existing NMR spectrometers with superconducting magnets worldwide are operated in a batch transfer method.

Within the scope of the present disclosure, helium transfers can be carried out with a suitable device such that large amounts of helium gas are not produced at room temperature. This is achieved in particular by the fact that cold helium gas is discharged during the transfer by a thermally insulated line from the NMR magnet (or more generally the usage cryostat) and is stored in the released volume in the transportation dewar (also called the reservoir cryostat) and is sometimes also used there for pressure build-up. The pressure difference necessary for the circulation can be established by means of a pump which is specifically suitable for cold fluids.

The circulation pump can either be arranged in the line for liquid helium leading to the NMR magnet, or in the line for gaseous helium leading away from the magnet. The latter is advantageous because the requirement to pump a boiling liquid (helium at 4.2 K and atmospheric pressure) is avoided. Boiling liquids are difficult to handle in pumps, for example due to the risk of formation of gas bubbles/cavitation.

For reasons that have primarily to do with aspects of operational safety and reliability, care should be taken to ensure that, where possible, a pressure that is below atmospheric pressure does not occur at any point in the helium circuit—particularly not in the NMR magnet. In the event of leaks in the system, this would result in air or other contaminants being sucked into the NMR magnet, freezing out there and leading to icing and blockages. The pressure in the NMR magnet can be realized by means of a pressure control valve and a connection to a gas accumulator (via a pressure controller).

It is also advantageous to provide an electric heater, by means of which the gas quantity in the circuit can be increased in order to be able to cause a pressure increase if necessary. This heater can be arranged in the end of the transfer line, which projects into the liquid helium in the transportation dewar. This has the advantage that the heater is part of the transfer device, and changes do not have to be made either at the NMR magnet or at the transportation dewar.

The pressure difference, required for the helium transfer, between the transportation dewar (or the reservoir cryostat) and the NMR magnet (or usage cryostat) can be achieved by the use of a speed-controlled pump, the pump power of which is controlled as a function of pressures measured by means of sensors. A pressure sensor can also be part of the transfer device. Also possible is a two-point control in which the pump is switched on and off at variable intervals.

As an alternative to a pump suitable for cold fluids, a pump can also be used at room temperature in combination with a heat exchanger. Above all, a countercurrent heat exchanger, for example in a tube-in-tube design, is recommended at this point.

Presentation of Preferred Embodiments

A first, preferred embodiment of a cryostat assembly 1 is shown in FIG. 1.

The cryostat assembly 1 comprises a usage cryostat 2, which here belongs to an NMR magnet and has a vacuum-insulated usage helium tank 3 for liquid helium 6/6a, and also a device 5 for transferring liquid helium 6. This device 5 comprises a reservoir cryostat 7 (also called a transportation dewar) with a vacuum-insulated reservoir helium tank 8 for liquid helium 6/6b, a vacuum-insulated supply line 9 for liquid helium 6, and a vacuum-insulated return line 10 for gaseous helium 11. A circulation pump 12a for cold, gaseous helium is arranged in the return line 10 as a conveying device 49.

For a transfer of liquid helium 6/6b from the reservoir helium tank 8 through the supply line 9 into the usage helium tank 3, cold, gaseous helium 11a is sucked out of the usage helium tank 3 by the circulation pump 12a and introduced into the reservoir helium tank 8 ("direct current"). As a result, the gas pressure of the gaseous helium 11/11b rises in the reservoir helium tank 8, and liquid helium 6/6 b is pushed from the reservoir helium tank 8 into the reservoir cryostat end 13 of the supply line 9 into the supply line 9, and liquid helium 6/6c exits at the usage cryostat end 14 of the supply line 9 and flows to the usage cryostat 2 ("indirect flow").

The circulation pump 12a is controlled by an electronic control unit 17, which also monitors a pressure sensor 18 in the reservoir helium tank 8 and a pressure sensor 19 in the usage helium tank 3. Furthermore, an electrical heating device 20 is also attached in the region of the end 13 of the supply line 9 which is immersed in the liquid helium 6/6b of the reservoir helium tank 8; this heating device 20 is likewise controlled by the control unit 17. Arranging the heating device 20 in the liquid phase guarantees a particularly rapid response behavior of the pressure control (or pressure difference control). Alternatively, the heating device can also be arranged in the gas phase—this can have energy-related advantages (a certain pressure increase can be achieved with a lower loss of liquid helium 6), but the pressure control then reacts more slowly. Via the circulation pump 12a, the control unit 17 can cause the pressure in the reservoir helium tank 8 to lie slightly above the pressure in the usage helium tank 3, so that liquid helium 6/6 c flows at the desired flow rate into the usage helium tank 3 through the supply line 9. A pressure difference of 50-100 mbar is usually sufficient for this purpose. Should the pressure in the system overall become too low, in particular below ambient pressure (atmospheric pressure of about 1 bar) in the usage helium tank 3 or in the reservoir helium tank 8, the control unit 17 can evaporate a little helium 6b in the reservoir helium tank 8 by means of the heating device 20 as an emergency measure. The additional helium gas increases the gas pressure in the system.

In the embodiment shown, the supply line 9 and the return line 10 are designed separately, and each of the lines 9, 10 is connected to its own magnet tower (helium tower) 15, 16 on the usage cryostat 2. The reservoir helium tank 8 in the reservoir cryocooler 7 has a storage volume of typically 100-400 liters.

Figure 2:
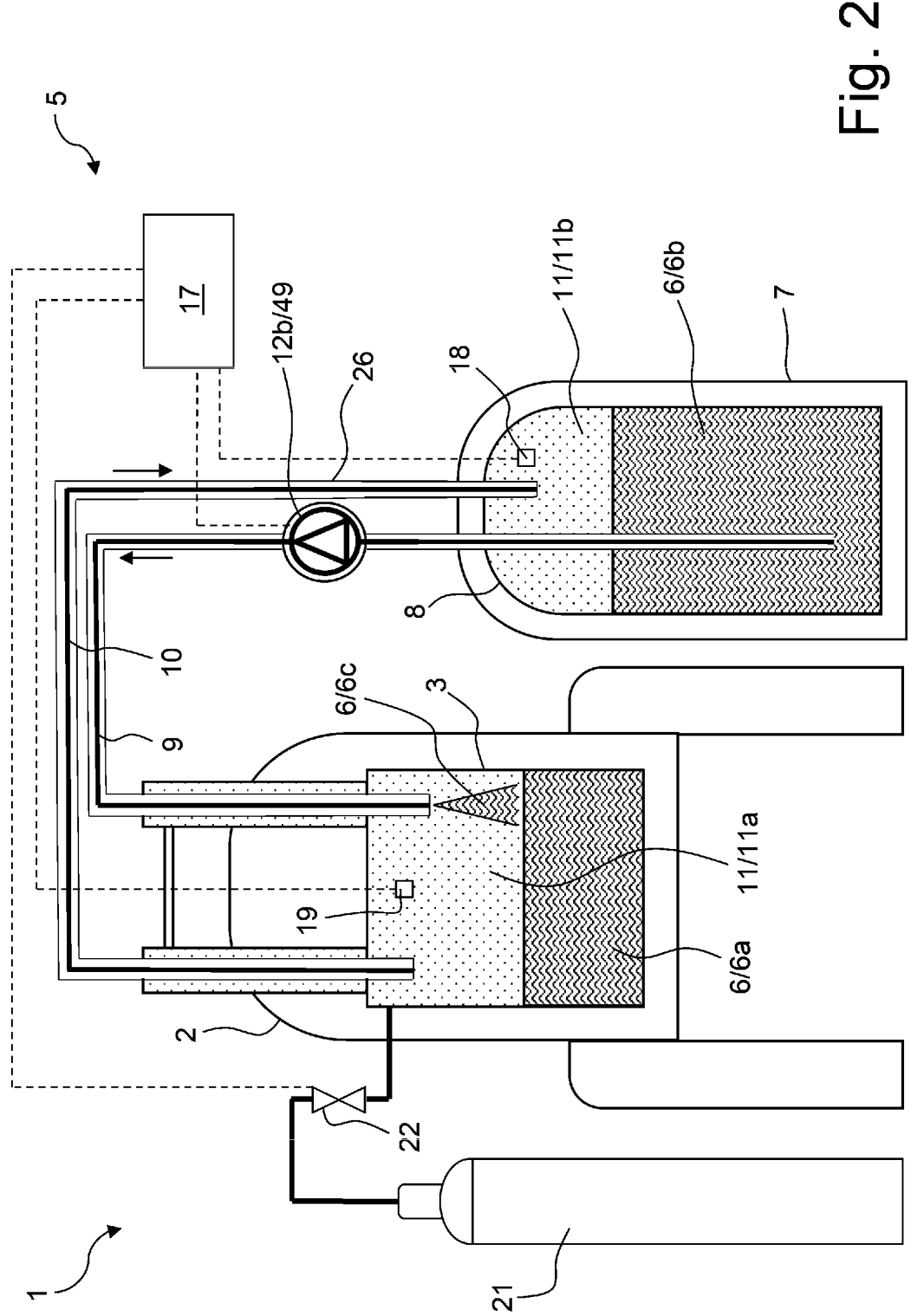
FIG. 2 shows a schematic representation of a second embodiment of a cryotank arrangement with a device for transferring liquid helium, with a circulation pump in the supply line.

A second embodiment of a cryostat assembly 1 is shown in FIG. 2; this second embodiment is largely similar to the design of FIG. 1, and therefore only the main differences will be explained here.

In the embodiment shown, the conveying device 49 is designed as a circulation pump 12b, which is arranged in the supply line 9 and pumps liquid helium 6/6b out of the reservoir helium tank 8 through the supply line 9 into the usage helium tank 3 ("direct flow"). The liquid helium 6/6c flowing into the usage helium tank 3 pushes a corresponding volume of gaseous helium 11/11a through the return line 10 into the reservoir helium tank 8 ("indirect flow"). In the reservoir helium tank 8, the gaseous helium 11/11b accumulates above the liquid helium 6/6b and can help to convey the liquid helium 6/6b into the supply line 9.

In the embodiment shown, a room-temperature helium pressurized gas accumulator 21 is provided, which is connected via a control valve 22 to the usage helium tank 3. Should the pressure in the system overall become too low, in particular below ambient pressure (which, at approximately atmospheric pressure, =1 bar) in the usage helium tank 3 or in the reservoir helium tank 8, the control unit 17 can allow a little helium gas to enter the usage helium tank 3 by means of the control valve 22. The additional helium gas increases the gas pressure in the system.

Figure 3:
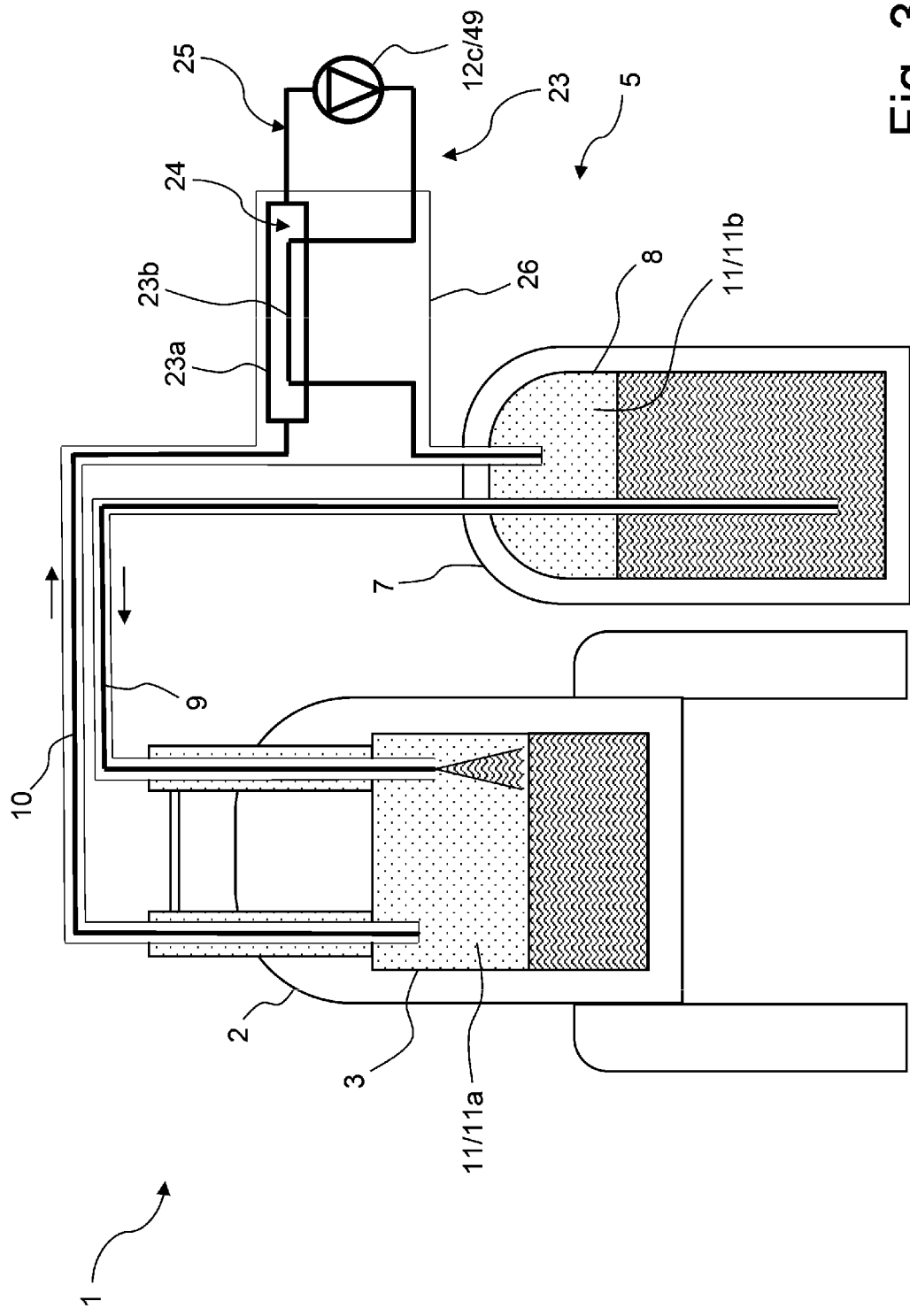
FIG. 3 shows a schematic representation of a third embodiment of a cryotank arrangement with a device for transferring liquid helium, with a room-temperature circulation pump in a line loop of the return line.

A third embodiment of a cryostat assembly 1 is shown in FIG. 3; this third embodiment is largely similar to the design of FIG. 1, and therefore only the main differences will be explained here. For simplification, the control unit and components connected thereto have been omitted in the illustration of FIG. 3.

In this embodiment, the conveying device 49 is formed with a circulation pump 12c in a line loop 23 of the return line 10. The line loop 23 is provided with a heat exchanger 24. In the design shown, an inlet region 23a of the conductor loop 23 is formed with an outer tube, and an outlet region 23b of the line loop 23 is formed with an inner tube, which runs in the outer tube ("tube-in-tube"). The initially cold gaseous helium 11/11b flowing out of the usage helium tank 3 flows through the outer tube and then flows into a room-temperature loop part 25, where it heats up. In the room-temperature loop part 25, the circulation pump 12c pumps the gaseous helium at room temperature (about 20° C.). The gaseous helium that is then at room temperature then flows from the circulation pump 12c to the inner tube and is cooled there by the surrounding cold gaseous helium in the outer tube. The gaseous helium which is cooled again with the heat exchanger 24 then flows into the reservoir helium tank 8.

It is noted that the heat exchanger 24 including the outer tube and the inner tube is vacuum-insulated, cf. the vacuum delimitation 26.

Common Transport Line

NMR magnets usually have two or three towers, which lead to the helium tank. In the embodiments shown so far, the helium is suctioned off in a magnet tower and supplied to another magnet tower; this is particularly simple for laying and connecting the supply line and return line, particularly when the NMR magnet has three towers, which is occasionally the case. Alternatively, it is also possible and advantageous to design the transfer device in such a way that helium is sucked up and supplied in the same tower. It can thus be ensured that in two-tower systems at least one tower remains free, so that a sufficiently large outflow cross section is available if the NMR magnet should quench during the helium transfer. The two lines (gas suction and supply of liquid helium) can be arranged coaxially, but at least in a common vacuum chamber.

FIG. 4 schematically illustrates a fourth embodiment of a cryotank assembly 1 in the region of the usage cryostat 2. Only the main differences from the design of FIG. 1 will be explained.

In the embodiment shown, the supply line 9 and the return line 10 run in a common vacuum delimitation 27, as a result of which a common transport line 28 is formed. The common transport line 28 leads via a single magnet tower (helium tower) 15 into the usage helium tank 3. The other magnet tower 16 is not required for the helium transfer, and is available in particular with its full cross section for a discharge of helium gas in the case of a quenching of a superconducting magnet coil (not shown) which is cooled with the liquid helium 6/6a in the usage helium tank 3. In the magnet tower 16, an overpressure valve or a rupture disc can be provided for this purpose (not shown in detail).

The transfer line (common transport line) is usually not designed to be rigid, but flexible, in order to make its handling (e.g. the insertion into the transportation dewar or in the NMR magnets) simpler. Instead of rigid pipes, flexible metal bellows are therefore preferably used. The lines that conduct fluids are often wrapped with super insulation film (or strip) for thermal insulation. In order to prevent the fluid-conducting lines from coming into direct contact with the warm delimiting line terminating the vacuum insulation volume (also called the vacuum delimitation), which would lead to an inadmissibly high heat input, the fluid-conducting lines are spaced apart from the delimiting line by means of separators. These separators (also called spacers) are produced from a material which has only a small thermal conductivity and therefore acts in a thermally insulating manner (e.g. nylon or G10). In addition, the spacers are geometrically preferably shaped such that the bridges, via which heat flows, are as long as possible, and thus have the smallest cross sections possible. In addition, the two lines can be designed coaxially, i.e. the line for the gaseous helium (with an annular cross section) surrounds the line for the liquid helium, the lines being insulated from one another by vacuum.

In order to keep the production costs for the transfer line (common transport line) small, it is also possible to embody both lines with a circular cross section. It is advantageous here to mechanically fasten the line for the liquid helium to the line for the gaseous helium via a thermally insulating structure in order to avoid a direct mechanical contact between the warm vacuum delimitation and the cold line for liquid helium.

Figure 5:
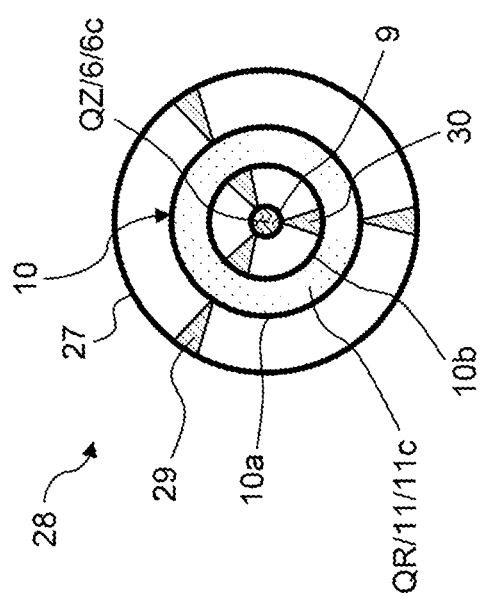
FIG. 5 shows a schematic cross section through a first design of a common transport line, with coaxial supply line and return line.

FIG. 5 shows a schematic cross section of an exemplary first design of a common transport line 28. Here, the common transport line 28 is circular in cross section. It has radially outwardly a vacuum delimitation 27, on which a plurality of separators 29 projecting radially inward are arranged. The return line 10, which is circular in cross section and in which gaseous helium 11/11c is guided, is secured radially inwardly to the separators. It should be noted that the return line 10 has a radially outer outer wall 10a and a radially inner inner wall 10b, which are supported against each other by means of auxiliary separators (not shown in greater detail). Further separators 30 are secured to the return line 10, projecting radially inward. The circular supply line 9, which carries liquid helium 6/6c, is secured radially inwardly to the separators. A vacuum prevails in the space between the vacuum delimitation 27 and the outer wall 10a of the return line, and a vacuum prevails in the space between the inner wall 10b of the return line 10 and the supply line 9. A line cross section QR of the return line 10 is here approximately 12 times as large as a line cross section QZ of the supply line 9.

Figure 6:
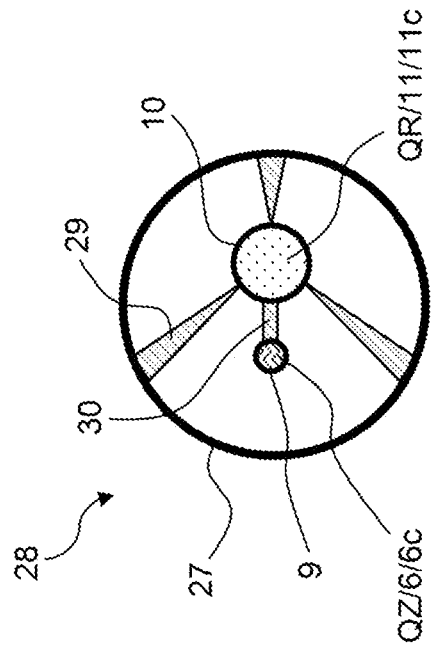
FIG. 6 shows a schematic cross section through a second design of a common transport line, with a parallel supply line and return line.

FIG. 6 shows a schematic cross section of an exemplary second design of a common transport line 28, which is likewise circular in cross section. In turn, separators 29 which project inwards are arranged on the vacuum delimitation 27. The circular return line 10, which guides gaseous helium 11/11c, is secured at the inner ends thereof. A further separator 30 protruding from the return line 10 is secured laterally to the return line 10. The circular supply line 9, which guides the liquid helium 6/6c, is secured at its end furthest away from the return line 10. The supply line 9 and the return line 10 are spaced apart from the vacuum delimitation 27. A vacuum prevails in the space between the vacuum delimitation 27 and the lines 9, 10. A line cross section QR of the return line 10 is here approximately 6 times as large as a line cross section QZ of the supply line 9.

In both designs of FIG. 5 and FIG. 6, the supply line 9 is mechanically connected to the vacuum delimitation 27 only via the return line 10.

Calculation Example and Integration in a Laboratory Liquefier

In typical transfer devices, the line for the liquid helium has a length of several meters and a diameter of about 4 mm.

At a flow rate of 12.5 kg/h, the flow rate in this line is approximately 2.2 m/s and the flow is turbulent (Reynolds number about 350,000). The pressure loss can be calculated in the event that the surfaces of the line can be assumed to be technically smooth and is approximately 10 mbar per meter of line length. This corresponds well to the practical observation that, in the case of lines having a length of several meters, a positive pressure of about 50 mbar must typically be applied in order to transfer liquid helium.

In the transfer device described here, the line for the gaseous helium (return line) should be designed such that the pressure loss is not inadmissibly high. It should be noted that the mass flow through the line for the gaseous helium (return line) is significantly smaller than the mass flow through the line for the liquid helium (supply line). Specifically, the mass flow through the line for the gaseous helium in a first approximation (namely assuming that the gaseous helium has a temperature of 4.2 K) is only 13.2 percent of the mass flow through the line for the liquid helium. In a first approximation, the volume flow through the two lines is the same. With the same cross section, the flow rate is therefore the same, and since the density of the gaseous helium is smaller than that of the liquid helium, a smaller Reynolds number (118,000) is also obtained and a smaller pressure loss in the order of 1.7 mbar per meter (for a diameter of 4 mm). The pressure loss in the line for the gaseous helium is therefore negligible.

In practice, due to imperfections in the insulation of the transfer line, due to the pump, due to friction, due to the limited efficiency of the heat exchanger, etc., heat inputs into the helium circuit occur, which result in the gaseous helium being slightly heated along the path from the NMR magnet to the transportation dewar. An example calculation shows that these heat inputs are kept small:

It is assumed that cold, gaseous helium at a rate of 1.6 kg/h flows from the NMR magnet to the transportation dewar. It should be mentioned that this value is at the lower end of the typical span, i.e. this is a "best-case" calculation for a relatively slow helium transfer. Assuming that the 1.6 kg of gaseous helium heat up from 4.2 K to 10 K along the path from the magnet to the transportation dewar, a "cold energy" of 55.68 kJ or a cooling capacity of 15 W would be necessary (over the time of one hour which the transfer lasts for) in order to cool the helium gas again to 4.2 K (the enthalpy of helium gas at 1 bar and 4.2 K is 20.6 kJ/kg; the enthalpy of helium at 1 bar and 10 K is 55.4 kJ/kg). This is about an order of magnitude more than, for example, a typical cryocooler in this temperature range.

When the temperature of the gaseous cold helium flowing back from the NMR magnet into the transportation dewar increases, the specific volume of the gas also increases, and the pressure loss in the line increases. Helium gas at 1 bar and a temperature of 10 K experiences, for example, a pressure drop of 6.6 mbar in a line with a diameter of 4 mm—this is significantly higher than the 1.7 mbar which were calculated for a gas temperature of 4.2 K. It is therefore advantageous to carry out the cross section of the line for the returning gas with a little reserve, so that the transfer device functions reliably even at higher gas temperatures.

The device for helium transfer described here can also be integrated into a "Lab Scale" helium liquefier (also referred to here as laboratory liquefier). In helium liquefiers of this kind, cryocoolers are used—usually pulse tube or Gifford-McMaon coolers—in order to liquefy gaseous helium with a comparatively low rate of approximately 20 l/d. The liquefiers usually have an integrated storage volume (volume of the helium tank in the cryostat of the laboratory liquefier) of a few hundred liters and are mounted on rollers. As soon as helium is to be transferred to an NMR magnet, the entire liquefier is moved into the vicinity of the magnet, and the transfer into the magnet takes place directly from the storage volume integrated in the liquefier.

If the transfer device described here is combined with such a "Lab Scale" liquefier or "laboratory liquefier", it is possible to use the cryocooler in order to cool the liquid helium in advance in the integrated storage volume to a temperature below 4.2 K. The liquid helium, for example, cooled to 2.8 K, is stored in the helium bath "cold energy" of 4.63 kJ/kg (the enthalpy of liquid helium at 1 bar and 4.2 K is −0.12 kJ/kg, and the enthalpy of liquid helium at 1 bar and 2.8 K is −4.75 kJ/kg). If 100 liters of liquid helium (i.e., 12.5 kg) are provided in the liquefier at the beginning of the transfer for the transfer (at 2.8 K), 57.8 kJ of cooling energy is thus available. This would be more than required to cool 1.6 kg of helium gas (which is the amount of gas which arises during a transfer of 100 liters of liquid helium) from the above-assumed 10 K back to 4.2 K. The cooling of the helium in the storage volume can take place over hours and days before the planned helium transfer, and the cryocooler used in the liquefier does not have to be excessively oversized for the proposed method.

Figure 7:
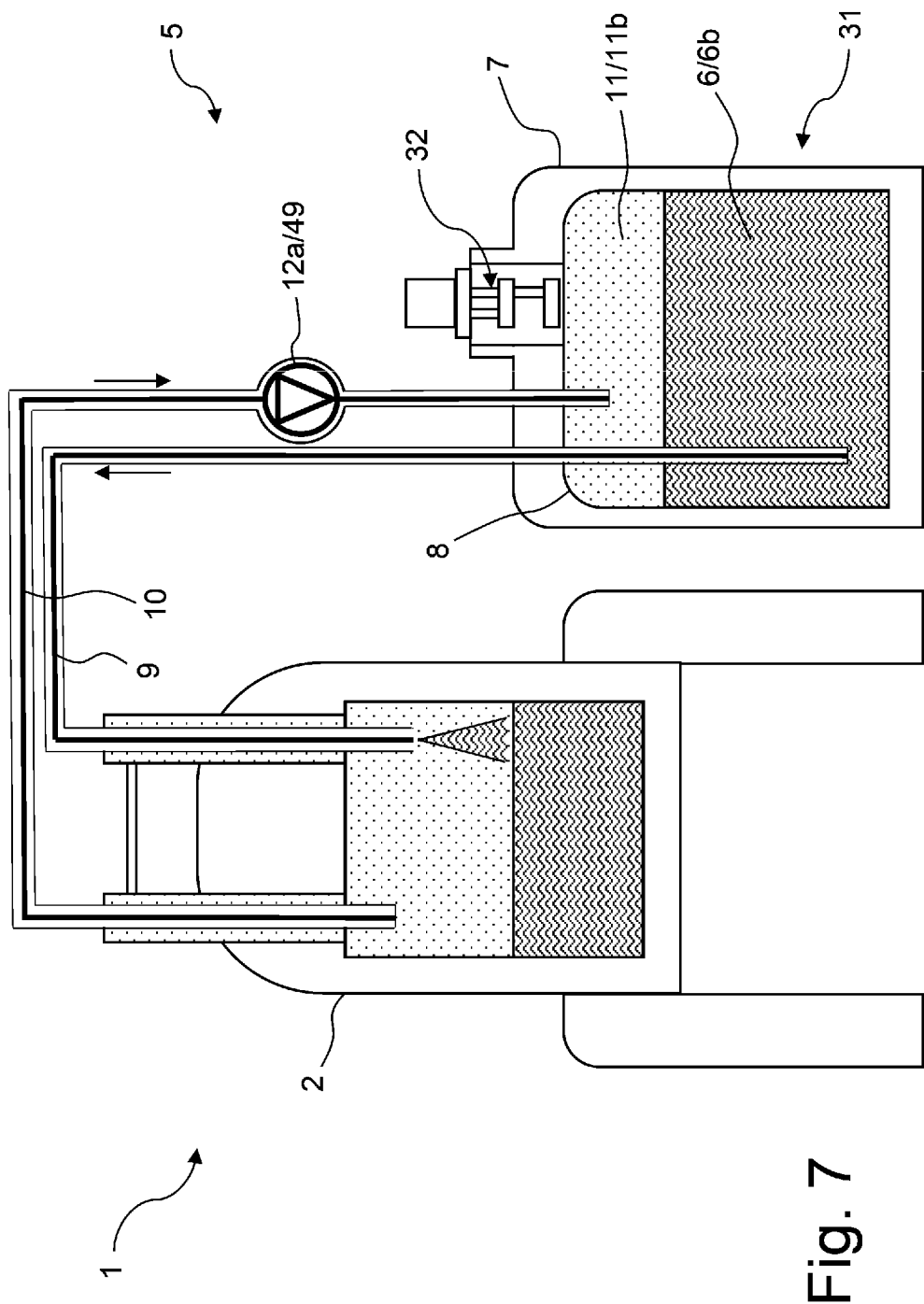
FIG. 7 shows a schematic representation of a fifth embodiment of a cryotank arrangement with a device for transferring liquid helium, with the reservoir cryostat being integrated in a laboratory liquefier.

A fifth embodiment of a cryostat assembly 1 is shown in FIG. 7; this fifth embodiment is largely similar to that of FIG. 1, and therefore only the main differences will be explained here. For simplification, the control unit and components connected thereto have been omitted in the illustration of FIG. 7.

In this embodiment, a laboratory liquefier 31 is integrated in the device 5 for transferring liquid helium 6. The laboratory liquefier 31 comprises the reservoir cryostat 7 with the reservoir helium tank 8 containing liquid helium 6/6b and a cryocooler 32. Gaseous helium 11/11b can be liquefied with the cryocooler 32. The coldest cooling stage of the cryocooler 32 is able here to achieve a temperature significantly below 4.2 K. It is thus possible to cool the liquid helium 6/6b in the reservoir helium tank 8 to a temperature TLHe significantly below 4.2 K, for example to approximately TLH=2.8 K here. The reservoir helium tank 8 in the reservoir cryostat 7 has a storage volume of typically 100-400 liters.

If the liquid helium 6/6b in the reservoir helium tank 8 is cooled below the temperature of the phase transition to the superfluid helium (2.17 K at atmospheric pressure), a particularly large cold supply is available due to the high specific heat in the region of the phase transition.

Embodiments with Displaceable Piston

Figure 8:
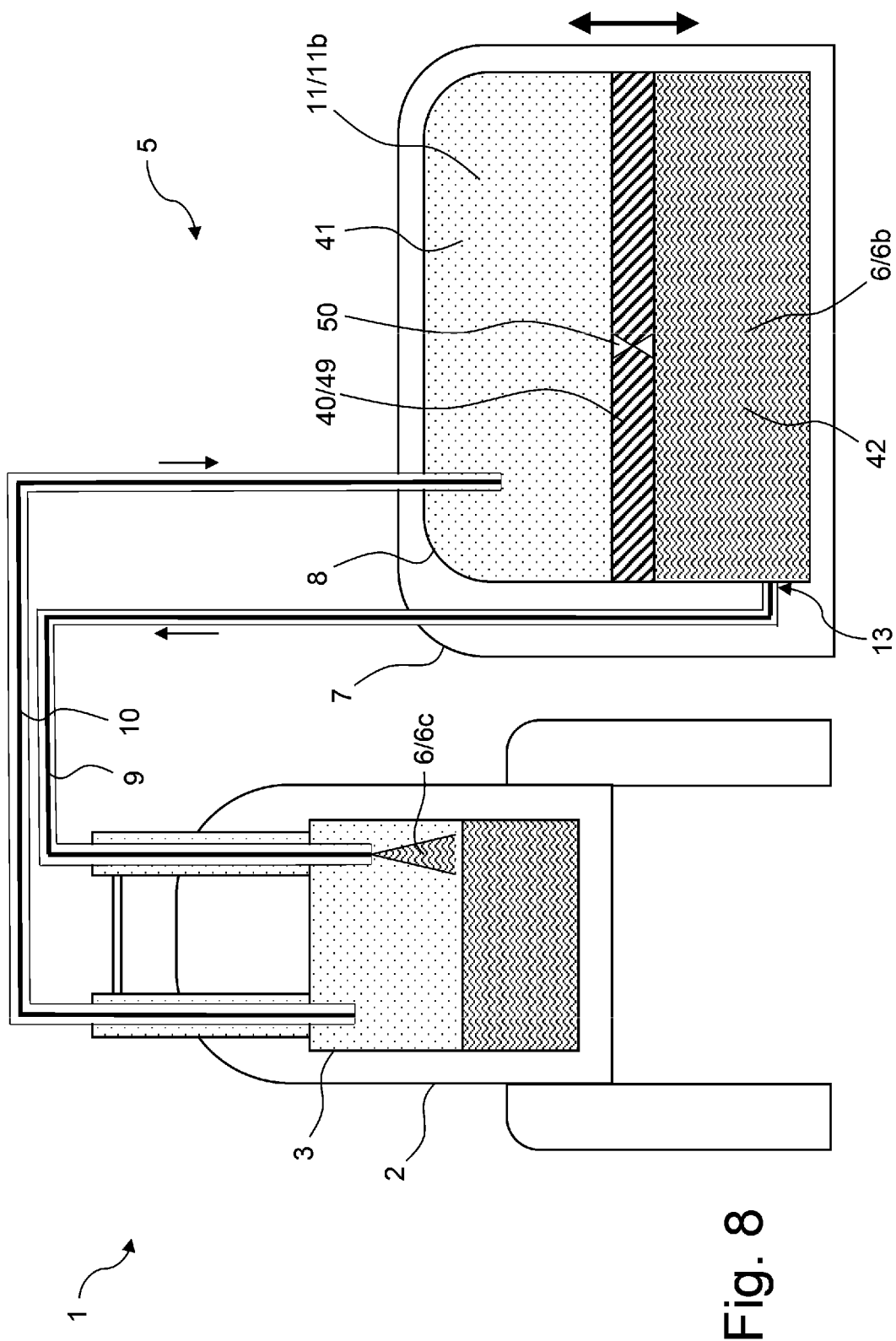
FIG. 8 shows a schematic representation of a sixth embodiment of a cryotank arrangement with a device for transferring liquid helium, with a vertically movable piston in a reservoir helium tank with rigid walls.
Figure 9:
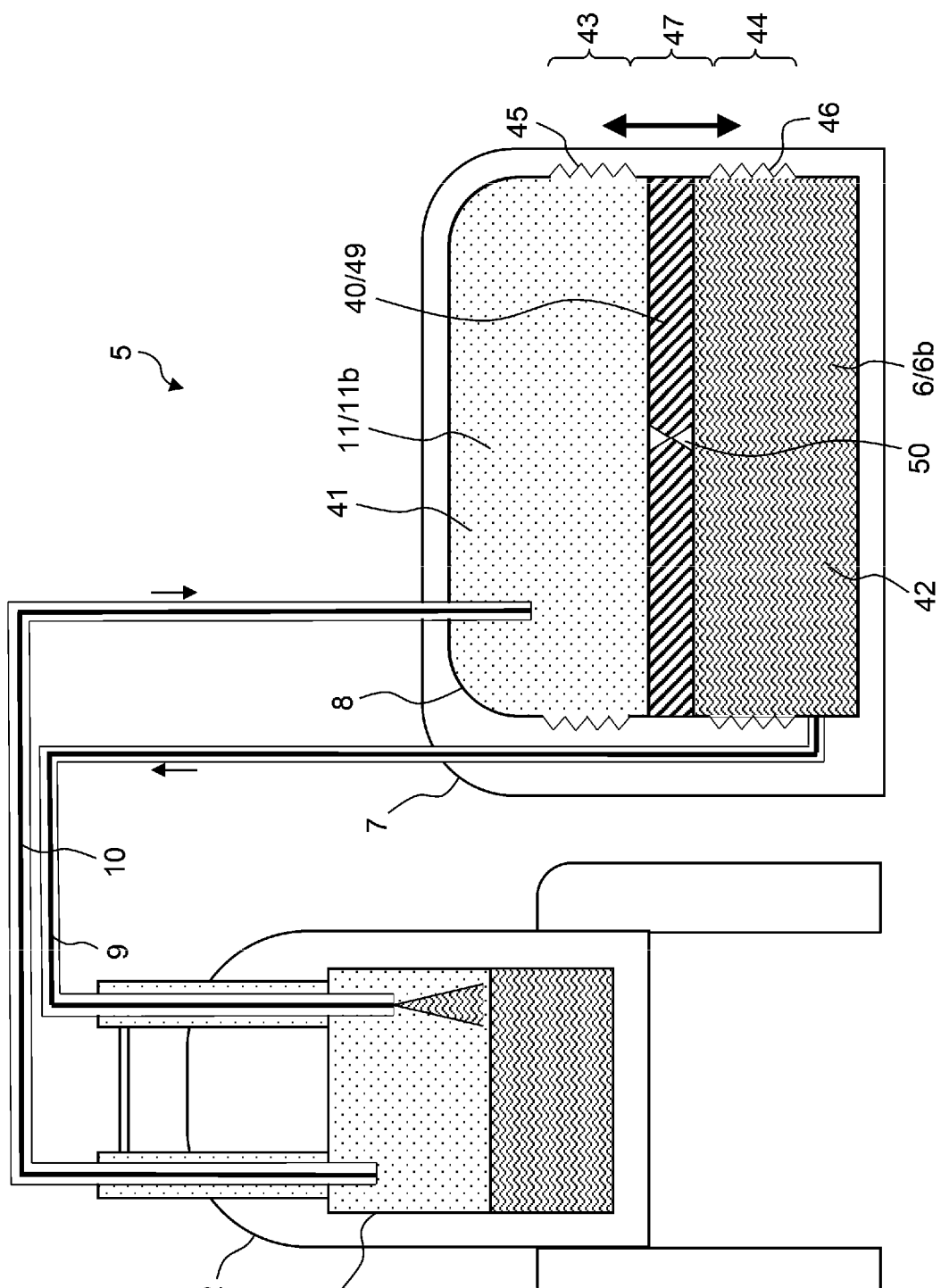
FIG. 9 shows a schematic representation of a seventh embodiment of a cryotank arrangement with a device for transferring liquid helium, with a vertically movable piston in a reservoir helium tank with walls partially formed as bellows.
Figure 10:
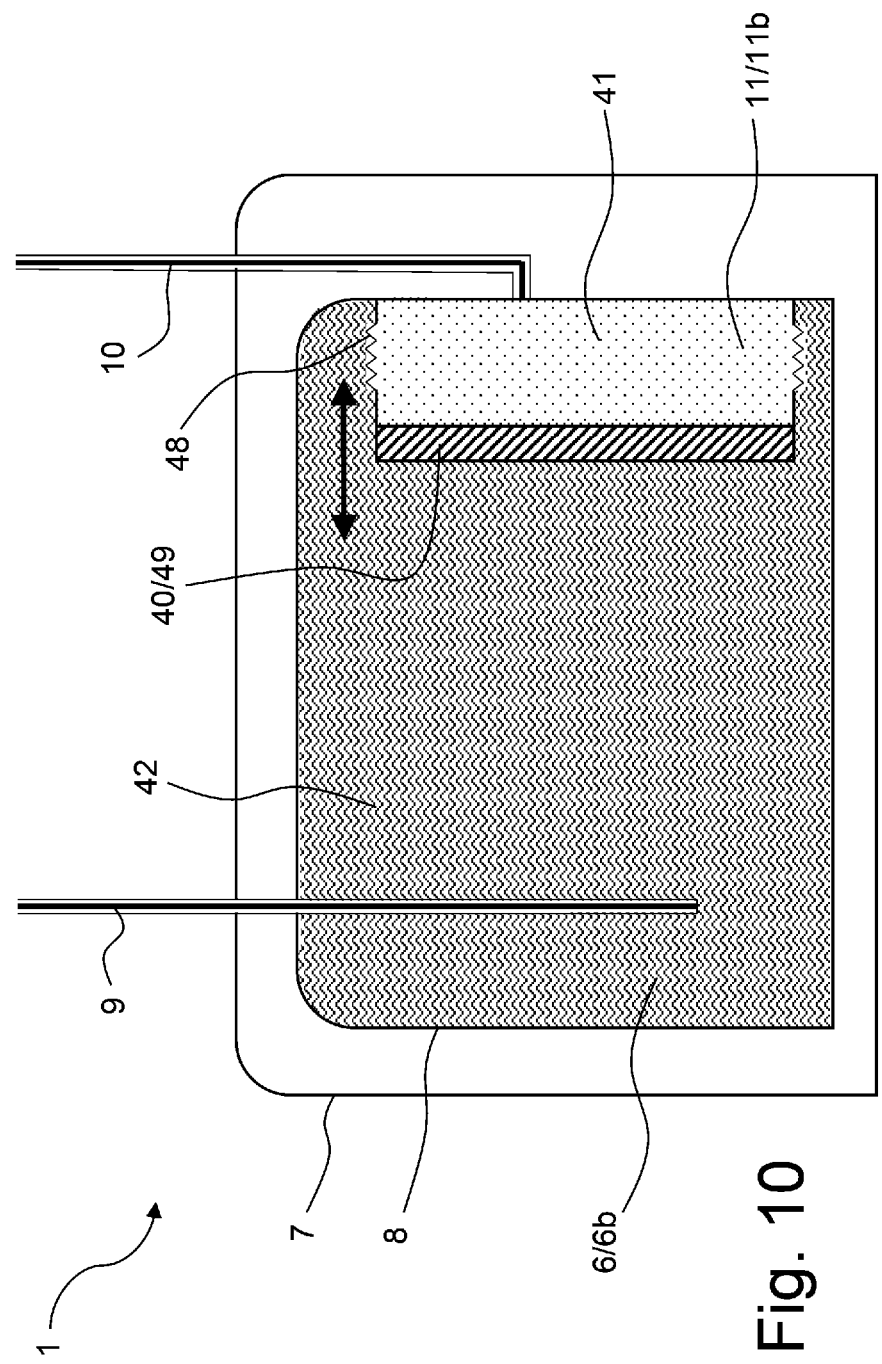
FIG. 10 shows a schematic representation of a detail of an eighth embodiment of a cryotank arrangement with a device for transferring liquid helium, with a horizontally movable piston in a reservoir helium tank with rigid walls, with the piston delimiting, together with a bellows, a partial space in the reservoir helium tank.

In FIGS. 8, 9 and 10, further embodiments of cryostat assemblies 1 are presented in schematic representations, in which the conveying device is formed with a movable piston in the reservoir cryostat 7. The embodiments accordingly largely correspond to the embodiment of FIG. 1, so that only the main differences are explained. For simplification, the control unit and components connected thereto have been omitted in the illustration of FIGS. 8 to 10.

In the sixth embodiment of FIG. 8, a piston 40, which is horizontally aligned here, of a conveying device 49 is arranged in the rigid, vacuum-insulated reservoir helium tank 8 and is displaceable via a motorized mechanism (not shown in greater detail) in the reservoir helium tank 8, here in the vertical direction. The reservoir helium tank 8 is divided by the piston 40 into an upper, first part 41 for gaseous helium 11/11b and into a lower, second part 42 for liquid helium 6/6b. The piston 40, which rests against the inner wall of the reservoir helium tank 8 and can slide along the inner wall, separates the two parts 41, 42 gas-tightly and liquid-tightly. The reservoir cryostat end 13 of the supply line 9 starts from the second part 42. The return line 10 leads into the first part 41.

By moving the piston 40 downwards, the second part 42 is reduced and liquid helium 6/6b is pushed into the supply line 9, and liquid helium 6/6c is thereby conveyed into the usage helium tank 3 in the usage cryostat 2. At the same time, the first part 41 is enlarged and helium gas 11 is drawn into the reservoir helium tank 8 from the return line 10 and is thereby conveyed from the usage helium tank 3 into the reservoir helium tank 8.

Preferably, the piston 40 is designed to be thermally insulating, in particular is designed to be vacuum-insulated. For this purpose, the piston 40 can consist wholly or partially of a material of low thermal conductivity, for example a plastic, preferably a foamed plastic. The piston 40 can also comprise two mutually opposite plates, between which a vacuum chamber is formed (not shown in detail).

It should be noted that it is harmless for the function of the conveying device 49 or the piston 40 if some liquid helium is also present in the first part 41, and/or some gaseous helium is also present in the second part (applies to all embodiments of FIGS. 8, 9 and 10). If desired, a valve 50 switchable via the control unit can be arranged in the piston 40, by means of which valve a passage in the piston 40 can be temporarily opened. For conveying the liquid helium 6/6b (as described above), the switchable valve 50 is closed, i.e. the piston 40 is "tight". If an interfering quantity of gaseous helium should have formed in the lower, second part 42 and/or if an interfering quantity of liquid helium should have formed in the upper, first part 41 (for example due to noticeable heat conduction through the piston 40), the switchable valve 50 can be opened in a conveying break. Liquid helium from the upper, first part 41 can then flow out into the lower, second part 42, and, by lowering the piston 40, the proportion of space in the lower, second part 42 which is filled with gaseous helium can be minimized; then, the switchable valve 50 is closed again, and the conveying operation is continued. Likewise, the switchable valve 50 can be opened during an original filling of the reservoir cryostat 7 with liquid helium 6/6b (for instance at a helium conveying facility) in order to enable filling "from above".

In the seventh embodiment of FIG. 9, which largely corresponds to the embodiment of FIG. 8, so that only the main differences therefrom will explained, a wall of the vacuum-insulated reservoir helium tank 8 is formed in an upper sub-portion 43 and in a lower sub-portion 44, in each case by a flexible bellows 45, 46. In a central sub-portion 47 and for the rest, the wall of the reservoir helium tank 8 is designed to be rigid. At the central sub-portion 47, the piston 40 of the conveying device 49 is secured rigidly and gas-tightly and liquid-tightly. In addition, the bellows 45, 46 are gas-tight and liquid-tight. The reservoir helium tank 8 is thereby divided into an upper, first part 41 for gaseous helium 11/11b and into a lower, second part 42 for liquid helium 6/6b. The piston 40, which is oriented horizontally here, is in turn displaceable via a motorized mechanism (not shown in greater detail) in the reservoir helium tank 8, here in the vertical direction, so that, by lowering the piston 40, liquid helium 6/6b from the reservoir helium tank 8 is discharged from the reservoir helium tank 8 into the supply line 9 and gaseous helium 11 can be sucked out of the return line 10 into the reservoir helium tank 8.

FIG. 10, for the sake of simplicity, shows merely a detail from an eighth embodiment of the cryostat assembly 1 in the region of the reservoir cryostat 7. The outwardly vacuum-insulated reservoir helium tank 8 is, here again, designed to be rigid. In the interior of the reservoir helium tank 8, a first part 41 for gaseous helium 11/11b is separated gas-tightly and liquid-tightly with the piston 40, which is oriented vertically here, and a flexible bellows 48, which is secured to the inner side of a vertical side wall of the reservoir helium tank 8; the rest of the interior of the reservoir helium tank 8 forms the second part 42 for liquid helium 6/6b. With a motor mechanism (not shown in greater detail), the piston 40 can be moved horizontally here. If the piston 42 is moved to the left in FIG. 10, that is to say the second part 42 is reduced and the first part 41 is enlarged, liquid helium 6/6b is discharged from the second part into the supply line 9, and gaseous helium 11 is sucked into the first part 41 at the return line 10.

For better thermal insulation between the first part 41 and the second part 42, the bellows 48 can also be designed to be thermally insulating, for example with a double wall and an intermediate vacuum chamber (not shown in greater detail).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 cryostat assembly
2 usage cryostat
3 usage helium tank
5 device for transferring liquid helium
6 liquid helium (generally)
6a liquid helium (in the usage helium tank)
6b liquid helium (in the reservoir helium tank)
6c liquid helium (conveyed through supply line)
7 reservoir cryostat (transportation dewar)
8 reservoir helium tank
9 supply line 10 return line
10 outer wall of the return line
10 inner wall of the return line
11 gaseous helium (generally)
11a gaseous helium (in the usage helium tank)
11b gaseous helium (in the reservoir helium tank)
11c gaseous helium (conveyed through the return line)
12a circulation pump (in return line, cold)
12b circulating pump (in supply line)
12c circulation pump (in return line, in line loop)
13 reservoir cryostat end of the supply line
14 usage cryostat end of the supply line
15 helium tower (magnet tower)
16 helium tower (magnet tower)
17 control unit
18 pressure sensor (in the reservoir helium tank)
19 pressure sensor (in the usage helium tank)
20 heating device
21 helium pressurized gas accumulator
22 control valve
23 line loop
23a input region of the line loop
23b output region of the line loop
24 heat exchanger
25 room-temperature loop part
26 vacuum delimitation
27 vacuum delimitation (common transport line)
28 common transport line
29 separator (vacuum delimitation to return line)
30 separator (return line to supply line)
31 laboratory liquefier
32 cryocooler
40 piston
41 first part
42 second part
43 upper sub-portion
44 lower sub-portion
45 upper bellows
46 lower bellows
47 central sub-portion
48 bellows
49 conveying device
50 switchable valve (in the piston)
QR line cross section of the return line
QZ line cross section of the supply line

The invention claimed is:

1. A device for transferring liquid helium into a usage helium tank of a usage cryostat, the device comprising:
   a reservoir cryostat with a vacuum-insulated reservoir helium tank storing liquid helium available for filling the usage helium tank,
   a supply line for liquid helium, the supply line proceeding from the vacuum-insulated reservoir helium tank and connected to the usage helium tank;
   a gaseous helium return line, the gaseous helium return line leading into the vacuum-insulated reservoir helium tank and connected to the usage helium tank; and
   a conveying device conveying liquid helium from the vacuum-insulated reservoir helium tank through the supply line into the usage helium tank and further conveying gaseous helium from the usage helium tank through the return line into the vacuum-insulated reservoir helium tank.

2. The device according to claim 1, wherein the supply line and the return line are vacuum-insulated.

3. The device according to claim 2, wherein the supply line and the return line are at least partially formed in a common transport line, which, within a common vacuum delimitation, has a vacuum chamber in which both the supply line and the return line run.

4. The device according to claim 3, wherein the supply line and the return line run coaxially within the common vacuum delimitation, with the supply line lying radially inside the return line.

5. The device according to claim 3, wherein the supply line and the return line run parallel to one another and next to one another in the common vacuum delimitation.

6. The device according to claim 3, wherein the return line is suspended from the common vacuum delimitation by means of one or more separators, and in that the supply line is suspended from the return line with one or more separators, but not from the common vacuum delimitation.

7. The device according to claim 1, wherein a line cross section of the supply line is greater than a line cross section of the return line.

8. The device according to claim 1, wherein the supply line and the return line are flexible.

9. The device according to claim 1, wherein the conveying device comprises a circulation pump for liquid helium in the supply line.

10. The device according to claim 1, wherein the conveying device comprises a circulation pump for gaseous helium in the return line.

11. The device according to claim 10, wherein the return line comprises a line loop with an inlet region and an outlet region,
   wherein the outlet region is thermally coupled to the inlet region via a heat exchanger, and
   wherein the line loop contains the circulation pump.

12. The device according to claim 1, wherein the conveying device comprises a piston configured to move in the reservoir helium tank, the piston separating a first part of the reservoir helium tank for gaseous helium from a second part of the reservoir helium tank for liquid helium, and
   wherein the supply line proceeds from the second part of the reservoir helium tank, and the return line leads into the first part of the reservoir helium tank.

13. The device according to claim 1, wherein the device further comprises a controller configured to control a helium pressure in the device and/or in the usage helium tank.

14. The device according to claim 13, wherein the device further comprises:
   a heater arranged in the reservoir helium tank; and/or
   a helium compressed gas accumulator with a control valve for connection to the usage helium tank,
   wherein the controller is configured to control the heater and/or the control valve.

15. The device according to claim 1, further comprising a laboratory liquefier for helium, the laboratory liquefier comprising:
   the reservoir cryostat with the reservoir helium tank, and
   a cryocooler for liquefying gaseous helium.

16. A cryotank assembly, comprising:
   the device according to claim 1; and
   the usage cryostat with the usage helium tank,
   wherein the supply line is connected to the usage helium tank and leads into the usage helium tank, and
   wherein the return line is connected to the usage helium tank and exits from the usage helium tank.

17. The cryotank assembly according to claim 16, further comprising at least one pressure sensor in a region of the usage helium tank,
   wherein the pressure sensor is connected to a controller of the device.

18. A method for transferring liquid helium from a reservoir helium tank of a reservoir cryostat into a usage helium tank of a usage cryostat, the method comprising:
    conveying liquid helium, stored in the reservoir helium tank, from the reservoir helium tank into the usage helium tank through a supply line for liquid helium, the supply line proceeding from the reservoir helium tank and being connected to the usage helium tank; and
    returning, at the same time, gaseous helium from the usage helium tank into the reservoir helium tank by a return line for gaseous helium, the return line being connected to the usage helium tank and leading into the reservoir helium tank.

19. The method according to claim 18, wherein a volume flow of liquid helium through the supply line is approximately equal to a volume flow of gaseous helium through the return line.

20. The method according to claim 18, wherein, at least at the start of the transfer of the liquid helium, a temperature TLHe of the liquid helium in the reservoir helium tank is less than 4.2 K, and
    wherein the temperature TLHe of the liquid helium in the reservoir helium tank is set before a start of the transfer of the liquid helium to a cryocooler of a laboratory liquefier in which the reservoir cryostat is integrated with the reservoir helium tank.

\* \* \* \* \*